Sept. 29, 1953     C. BEST     2,653,698
CONVEYER AND TRANSFER MECHANISM FOR USE WITH WEIGHING MACHINES
Filed May 12, 1950     6 Sheets-Sheet 1

INVENTOR
Cyril Best
By Watson, Cole, Grindle, & Watson
ATTYS

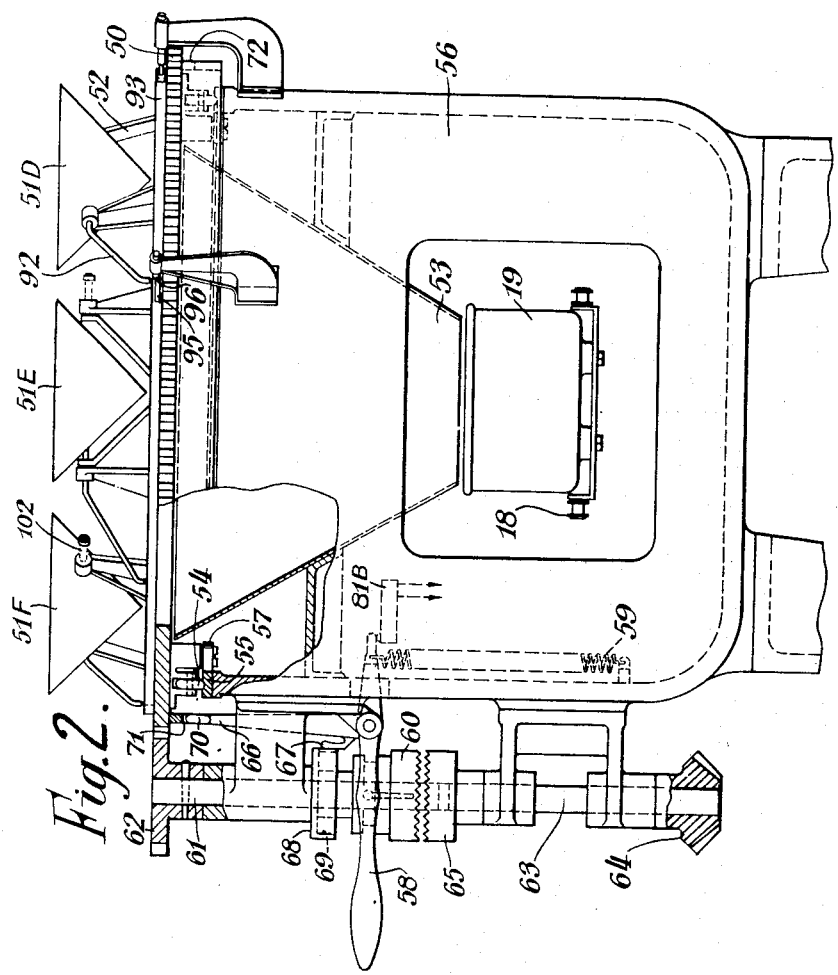

Sept. 29, 1953     C. BEST     2,653,698
CONVEYER AND TRANSFER MECHANISM FOR USE WITH WEIGHING MACHINES
Filed May 12, 1950     6 Sheets-Sheet 3
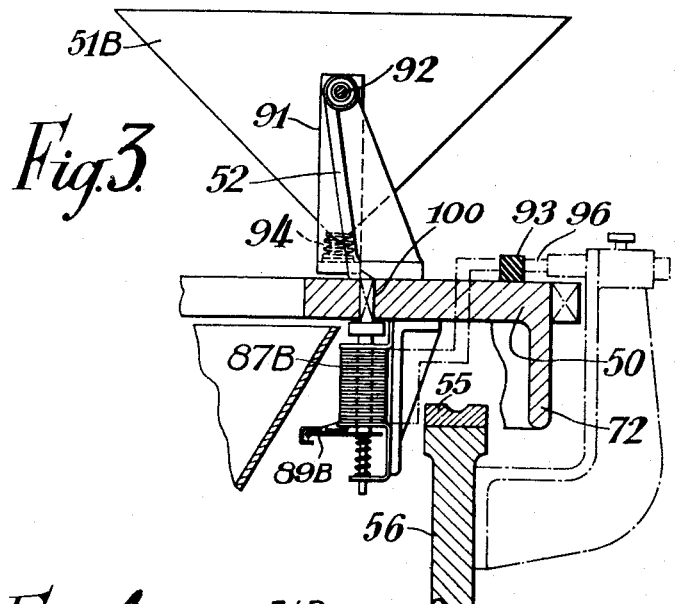
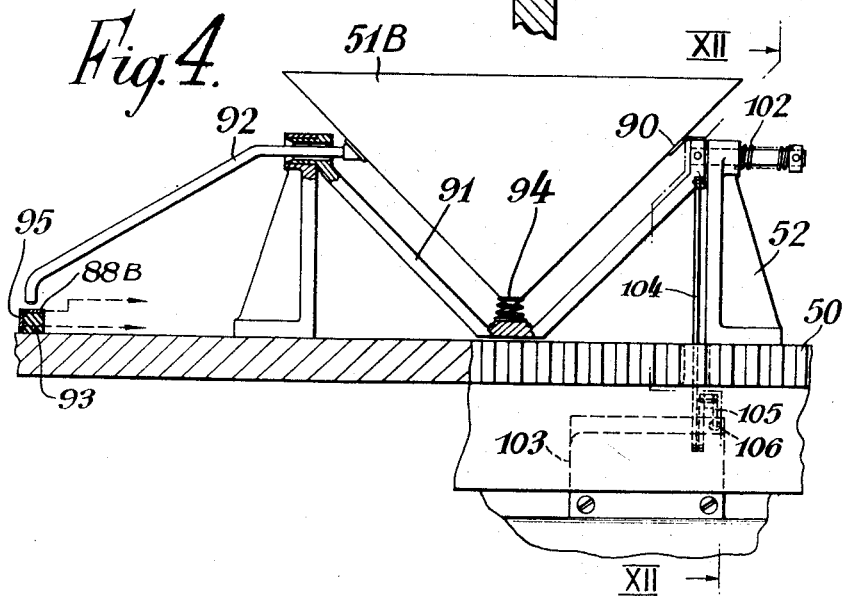
INVENTOR
Cyril Best
By Watson, Cole, Grindle & Watson
ATTYS Sept. 29, 1953     C. BEST     2,653,698
CONVEYER AND TRANSFER MECHANISM FOR USE WITH WEIGHING MACHINES
Filed May 12, 1950     6 Sheets-Sheet 4
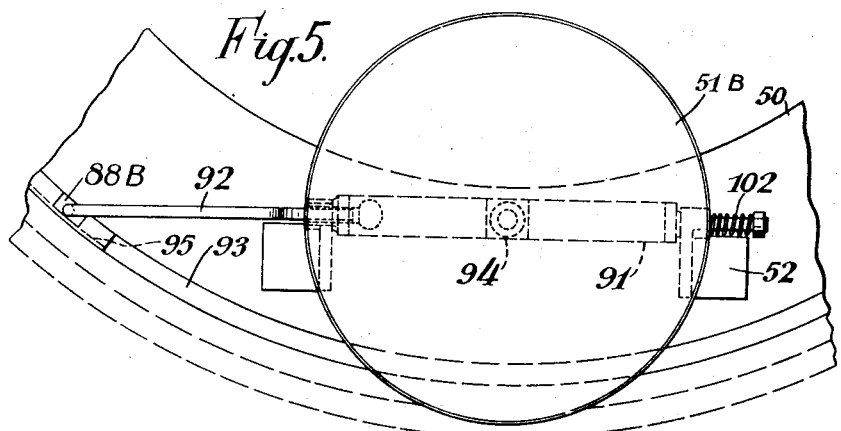
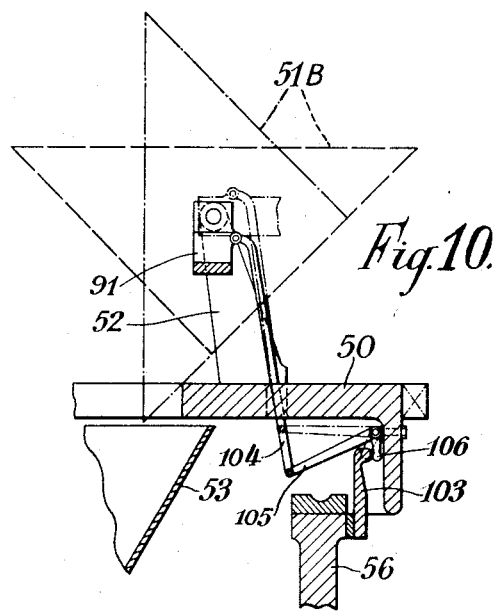
INVENTOR
Cyril Best
By Watson, Cole, Grindle & Watson
ATTYS

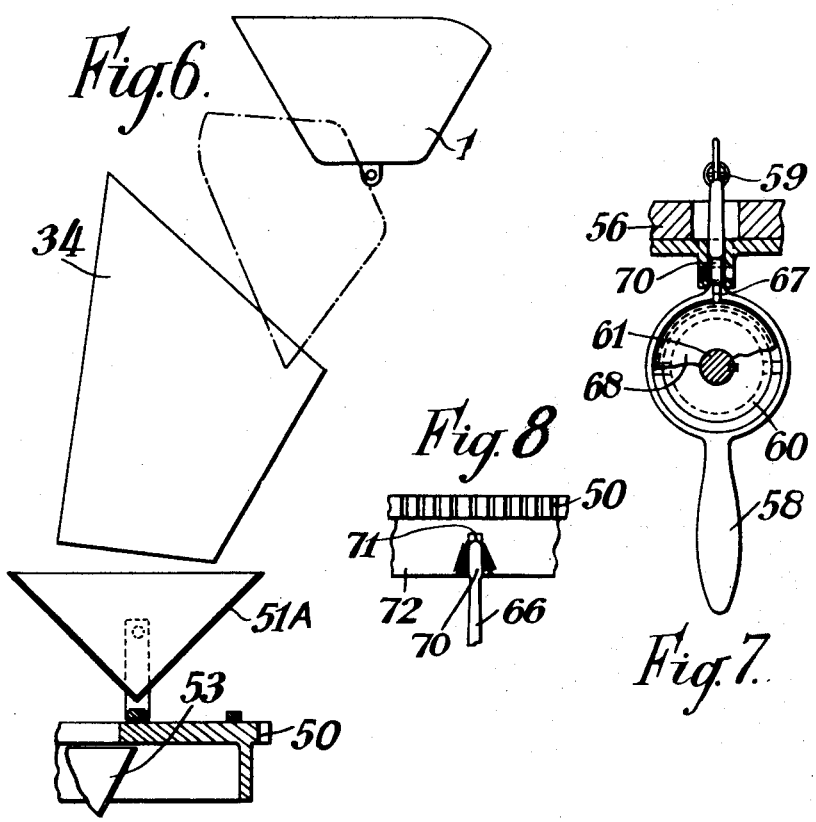

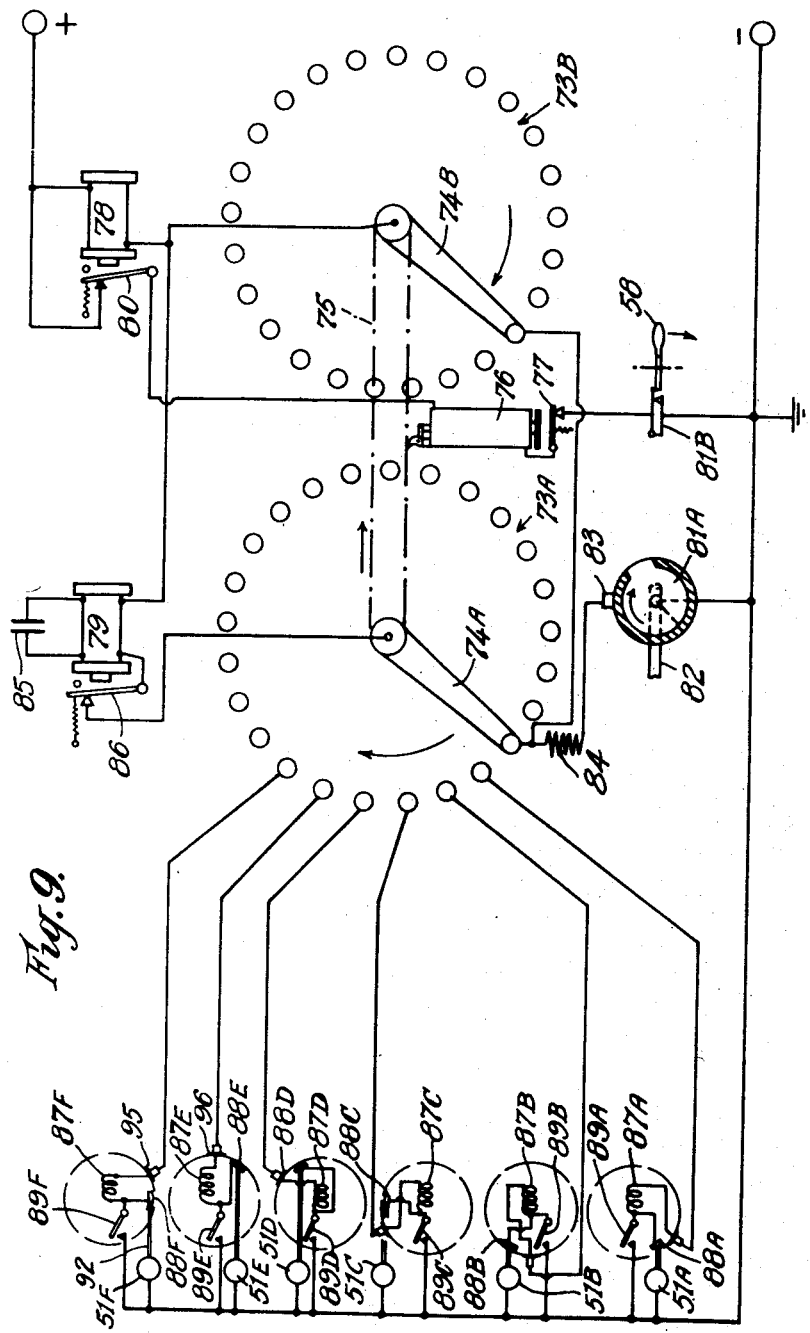

Patented Sept. 29, 1953

2,653,698

UNITED STATES PATENT OFFICE 2,653,698

CONVEYER AND TRANSFER MECHANISM FOR USE WITH WEIGHING MACHINES

Cyril Best, Deptford, London, England, assignor to Molins Machine Company Limited, London, England, a British company Application May 12, 1950, Serial No. 161,562
In Great Britain May 18, 1949

3 Claims. (Cl. 198—39)

1

This invention concerns improvements in or relating to weighing machines and more particularly a device for receiving weighed material discharged from a weighing machine and transferring it to some other apparatus, for example, a packing machine.

In the weighing of loose material to produce numbers of weighed parcels of material it is generally necessary to employ an attendant at the weighing machine, at any rate where the material is valuable, and accurate weighing is desired. In particular, fibrous tangled material such as tobacco must be weighed manually so that it can be disentangled and tobacco must be weighed with great accuracy in view of its extremely high cost and the need for ensuring correct weight at the time of packing.

If the weighed parcels are to be delivered forthwith to a packing machine the speed of weighing is determined by the desired output of the machine, that is, an individual weighing must not take longer than the time of an individual packing operation or, more generally, the weighing machine operator must keep time with the packing machine. This is an undesirable condition particularly where tangled material is being weighed. Though a fair average time for weighing may be determined, there is a good deal of variation in the time taken (by the same person) for each of a large number of weighings effected, for example, in a working day. Sometimes an operator can place an almost exact quantity of tobacco in a pan at the first movement while at other times the nature of the material may hinder this. Or again, different operators have different working speeds and if an automatic machine is being served, the speed must be set to suit the slowest operator, if, as is often the case, a number of weighing machines supply a single packer.

An object of the invention is to provide a device whereby differences in performance by weighing machine operators may be nullified or smoothed-out so that time saved when the operator is working quickly or the material is particularly tractable may be utilised later when conditions are more difficult.

The invention will be more fully described by way of example with reference to the accompanying drawings in which:

Figure 1 is a plan view of a construction according to the invention,

Figure 2 is a side elevation of Figure 1 looking in the direction of the arrow A, Figure 3 is a side elevation of a pan shown in Figures 1 and 2, drawn to a larger scale and showing some neighboring parts of the apparatus partly in section, Figure 4 is a front elevation of a pan shown in Figures 1 and 2, drawn to a larger scale and showing some neighbouring parts of the apparatus, Figure 5 is a plan of Figure 4, Figure 6 is a section of Figure 1 on the line VI—VI.

Figures 7 and 8 are details of a clutch device shown in Figure 2,

Figure 9 is a circuit diagram of electrical devices for controlling the movements of pans shown in Figures 1 to 6, and Figure 10 is a section on line X—X, Figure 4, of a diagrammatic nature showing details of pan tilting mechanism.

Figure 1:
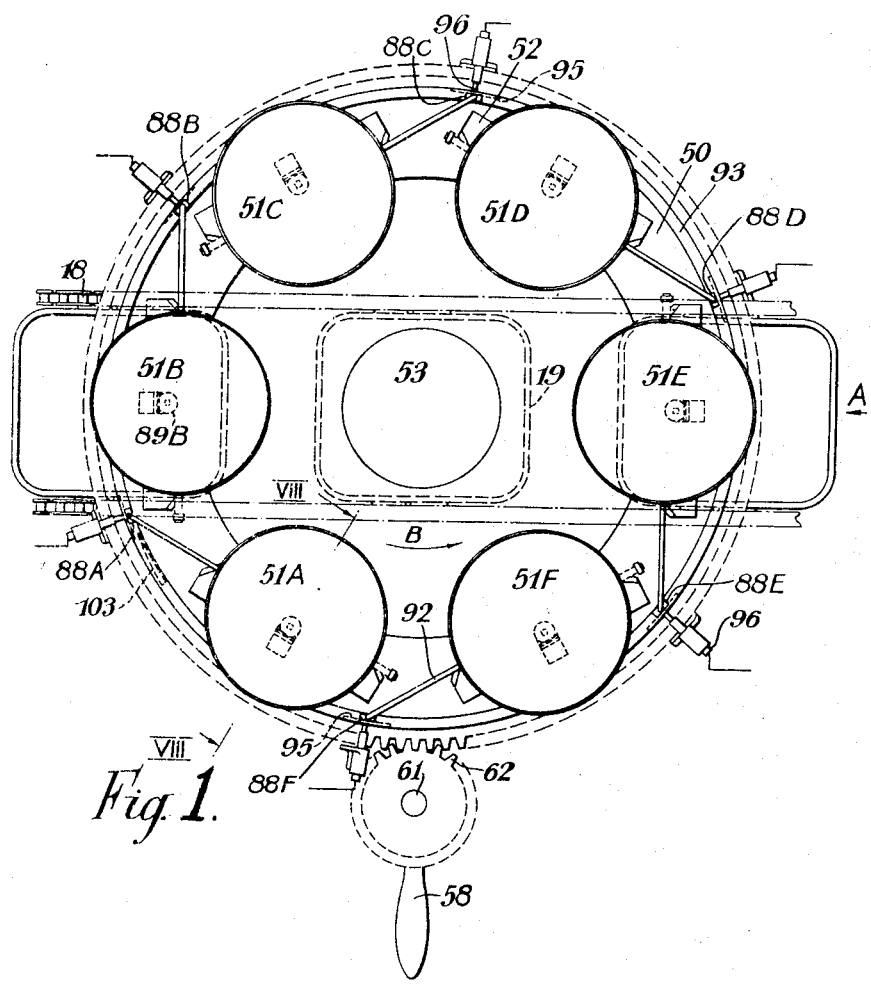

Referring to the drawings, in Figure 2 a bucket 19 which is one of a number carried on chains 18 is shown. The conveyor formed by chains and buckets moves at right angles to the plane of the figure. The apparatus comprises a rotatable turntable consisting of a ring 50, Figure 1, which is provided with gear teeth on its outer edge by means of which it is intermittently rotated. On the ring there are mounted six pans numbered from 51A to 51F. The pans are supported on brackets 52, fixed to the ring and are equally spaced around the ring. As described in more detail later, the pans are tilted inwardly by springs in order that each may discharge a parcel of tobacco as required down a centrally disposed funnel 53, beneath which the buckets 19 travel. The ring 50 is provided with rollers 54 which run in a grooved circular track 55 which is fixed at the top of a substantially cylindrical casting 56 which forms the main frame of the apparatus. Other rollers 57 engage the inner side of the track 55 to prevent the ring 50 from becoming displaced.

As will be seen from Figure 1 the six pans 51A to 51F are equally spaced about the axis of the ring 50 and thus each intermittent movement is required to rotate the ring 60°. The movement is effected by the operator who presses a clutch lever 58 downwards against the influence of a spring 59. As will be seen from Figure 2 the lever works in a circumferential groove of a clutch member 60 which is splined to a shaft 61 to the upper end of which is fixed a gear wheel 62, of such diameter that one revolution thereof causes the ring 50 to turn through 60°. Coaxial with the shaft 61 is a main driving shaft 63 at the lower end of which is fixed a bevel wheel 64 or other driving member by means of which the shaft 63 is continuously rotated. It may, for example, be driven from the conveyor chain 18 or by an electric motor. The shaft 63 has a clutch member 65 fixed thereto and it will be seen that when the lever 58 is depressed the clutch engages and the gear wheel 62 is rotated and drives the ring 50. In order to ensure that the clutch is disengaged after the gear wheel 62 has made a single revolution there is fixed to the lever 58 an arm 66 which has a tooth 67 on it. The clutch member 60 also comprises a disc 68 which has a downwardly extending flange 69 and in the rim of the flange there is formed a slot of such width that the tooth 67 can easily enter or leave the slot. It will be seen that if the slot is in a suitable position the lever 58 can be depressed so that the tooth will enter the slot and the clutch will engage. Immediately the clutch engages, the disc 68 will start to rotate and the tooth will be held by the inner surface of the flange 69 so that the clutch cannot disengage. At the end of a single revolution the tooth will slip out of the slot and the clutch will disengage, both movements taking place under the influence of the spring 69. In order to ensure that the ring 50 executes exactly 60° of rotation when the clutch is engaged and disengaged, the arm 66 extends upwardly and has a suitably shaped end 70 which enters into a slot 71 in a downwardly depending flange 72 integral with the ring 50, the outer side of the slot 71 and the lever end 70 being suitably shaped to ensure proper engagement, see Figure 8. Thus if the gearing does not move the ring 50 by exactly 60° then engagement between the parts 70 and 71 will locate the ring 50 in its exact position. A brake may be fitted to control the movement of the ring 50 and prevent overrun.

In Figure 6, 1 represents the pan of a weighing apparatus, for example, that shown in U. S. Patent No. 2,595,803. The operator causes the weighing pan 1 to discharge its contents as soon as the correct weighing is made, through the funnel 34 into a pan. The weighing machine is so located that the said pan is the one marked 51A, Figure 1; see also Figure 6. When the pan 1 has discharged its contents into the pan 51A, the operator presses the clutch lever 58 and the turntable rotates 60° in the direction of the arrow B, Figure 1, to bring the next pan into position and as soon as she has weighed a further quantity of tobacco she repeats the operation. It will thus be seen that the operator can load any empty pans as fast as she can weigh the tobacco and in this way the variations in the time of effecting weighing operations are catered for, because her total output is equal to the rate at which the buckets 19 are to be loaded. Variations in individual weighing times do not matter because there are always some pans containing tobacco ready for discharge into the funnel 53, though as will be readily understood there may be sometimes only one filled pan beyond the position occupied by the pan 51A or under exceptionally good circumstances as many as four. To cater for every possible circumstance provision is made for tilting any of the pans to discharge tobacco into the funnel, including the one at 51A, immediately it has been filled though the necessity for emptying 51A is never likely to occur in practice.

It is therefore necessary to provide some means whereby the leading filled pan will be the first to be discharged into the funnel 53 and such means consists of an electrical control device about to be described with reference to Figure 9. Referring to Figure 9 there is shown at the right hand of the figure a diagrammatic representation of a telephone type uni-selector switch comprising two banks of contacts 73A and 73B with rotating contact arms, 74A and 74B. It will be readily understood that the arms 74A and 74B are on a single spindle and the banks 73A and 73B are coaxial and the arms, which are shown in the home position, naturally rotate at the same rate. The rotary connection is shown diagrammatically by a chain line 75. Rotation of the arms is effected by a ratchet wheel, not shown, fixed to the spindle which comprises the arms 74A and 74B and this ratchet wheel is driven by a stepping magnet marked 76, the magnet armature operating the pawl which drives the ratchet wheel so that the arms can make a complete revolution very quickly. There are 25 contacts to each bank and the time taken to cover the six contacts required for the present device may be as little as 0.12 second. The stepping magnet 76 also comprises a contact arm 77, which breaks circuit at each magnet impulse and thus provides the necessary intermittent movement.

Two relays 78 and 79 are also provided, the contact 80 of relay 78 being in series with the stepping magnet 76. In addition there is a timing switch device comprising a rotary timing switch marked 81A and another switch marked 81B. The switch 81A comprises a contact segment fixed to a disc which is rotated on a shaft 82. A brush 83 rubbing on the segment of 81A is connected through a resistance 84 to the contact stud which forms the home position of contact arm 74A. As it is necessary that pan discharge must take place in timed relationship with the arrival of a conveyor bucket beneath the funnel 53 the shaft 82 is driven in synchronism with the conveyor chains.

The relay 78 is a very high speed relay capable of changing the position of the relay arm 80 between successive steps of the contact arms 74A and 74B. The relay 79 has a condenser 85 across it to slow up or delay the operation of its contact arm 86, for reasons explained in mere detail later.

Each pan on the ring 50 is controlled in its tilting movements by means of a tilting magnet and these are indicated in the diagram by references 87A up to 87F directed to the coils of the magnets. The description of the actual tilting and the devices for controlling the tilting by the magnets will be deferred but at present it is sufficient to say that when current flows through any tilting magnet the corresponding pan is able to tilt and discharge its contents through the funnel 53. Each pan comprises an electrical contact device which is engaged when the pan is full and disengaged when the pan is empty, the precise details being described later and these contacts are essential features of the device as until a pan has been filled the contact is not made. This enables filled pans to be detected. The respective contacts for the various pans are marked 88A to 88F. The resistance 84 has a value equal to that of any one of the tilting magnet coils 87A to 87F.

It will be understood that as soon as a pan starts to tilt, the contact (88A to 88F) of the pan will be broken and the tilting magnets each comprise a hold-on contact (89A to 89F) which as soon as the respective tilting magnet is energised provides an alternative circuit to that formed by the respective pan contact. These hold-on contacts are therefore provided to maintain the circuit while tobacco is being discharged, this provision being necessary to keep the stepping magnet in operation as explained in the following description of the operation of the device.

Figure 9 shows the circuit before current is switched on. When the current supply is switched on, the relay coil 78 is energised and the contact 80 is pulled open so that nothing else moves. Although the stepping magnet 76 is also in circuit at the instant the current is switched on its operation is sluggish relatively to that of the coil 78 so the contact 80 opens before the magnet can move its armature. At the desired point in the cycle, that is, when a bucket 19 is in position below the funnel 53 the timing switch 81A opens. This breaks the circuit to the coil 78 and therefore the contact 80 closes again. This contact then connects the coil of the stepping magnet 76 to the positive and negative lines so the magnet starts to move the arms 74A and 74B of the uniselector switch.

These continue to rotate until the arm 74A touches a stud of the bank 73A which is connected to the first of the contacts 88A to 88F which is closed by the weight of tobacco in the corresponding pan. A circuit is then re-established to the coil of the relay 78 through the coil of relay 79, its contact 86, arm 74A and the said corresponding pan. The contact 80 thereupon opens and breaks circuit and the magnet 76 is de-energised causing the uni-selector switch arms to stop in this position. At the same time the current through the corresponding tilting magnet (87A to 87F) allows the said corresponding pan to tilt and after a short period the voltage across condenser 85 increases sufficiently to cause operation of the relay 79 so that its contact 86 opens. This breaks the circuit through the coil 78 and contact 80 closes again thus restarting the stepping motor and this rotates the arms 74A and 74B right round back to their original position (that shown in Figure 9) the circuit leading to the relay coil 78 now being restored to its old path through the resistance 84, and the timing switch 81A which, owing to its motion, has previously reclosed.

The relay 79 has the condenser 85 across it for two reasons; the first is to prevent the contact arm 86 opening and restarting the stepping motor before the tilting magnet has done its work, and the second is to ensure that once the arm 86 has opened it will remain open while the uniselector switch is homing back to its original position. It will be realised that without this provision, as the arm 74A moved over the remainder of the active contacts of the switch it would find a circuit to earth through each of the remaining filled pans, so that if it had initially emptied say the pan 51B, it would then empty the rest in turn.

The timing switch 81B is located near the clutch lever 58 and is only engaged when the clutch lever is disengaged. In this way selecting cannot take place while the pans are changing their positions.

The construction of the pan contact switches may be seen from Figures 1, 2, 4 and 5. A pan, as previously mentioned, is supported on brackets 52 but it is movable to a small extent with respect to the brackets. For this purpose a pan comprises a hinge 90 by which it is fixed to a cradle 91, the latter being provided with pivots which fit in holes in the brackets and form the actual support pivots for the pan. One pivot has a hole in it through which projects a bent wire 92 which is fixed to the pan. This wire forms a contact arm capable of moving into contact with a metal plate mounted on an insulating ring 93, fixed to the ring 50, under the weight of tobacco which turns the pan on its hinge 90 against the action of a compression spring 94 fixed to the cradle. The plates with which the arms 92 engage are marked 88A to 88F to correspond with the references in Figure 9. The ring 93 also has metal segments 95 at equally spaced positions. Brushes 96 rub on the ring 93 as it rotates with the ring 50 and thus each time the ring 50 stops, each segment 95 is engaging a brush. In Figure 3 a brush and its supports are shown in detail in chain lines; the parts not being truly visible in the particular section at which the view is taken. The wire 92 also serve as a support for the pan when tilting takes place.

The actual details of pan tilting and restoring will now be described, reference being made to Figures 1, 3, 4 and 10.

A tilting magnet is shown in Figure 3 and the resetting devices in Figures 4 and 10. The pan shown is marked 51B because the mechanism for resetting a tilted pan to the upright position must operate between the positions 51B and 51A so that a pan arriving at the latter position is ready to receive tobacco. As previously explained, a pan tilts when its magnet is energised. The magnet 87B shown in Figure 3 has a movable core 100 which projects upwards through the ring 50 and forms a catch which prevents the cradle 91 from moving to the tilting position. At one pivot of the pan is a torsion spring 102 tending to tilt the pan, so as soon as the catch is released, the pan will tilt. Thus if the magnet 87B is energised, the pan tilts. The pan is restored to its normal position by a cam 103 located at the position shown in Figure 1. A link 104 pivoted to the cradle passes down through a hole in the ring 50 and is connected at its lower end to a bell crank lever 105 one arm of which has a follower 106 which runs on the cam and causes the cradle to swing back against the influence of the spring. The upper end of the core 100 is bevelled so that the cradle can snap past it. The action can be followed from Figure 10 where the pan is shown in dash lines in its normal position and in dot and dash lines in the tilted position, where it is stopped by the inner edge of the ring 50.

What I claim as my invention and desire to secure by Letters Patent is:

1. Apparatus for delivering from a weighing machine a succession of weighed parcels of material comprising, in combination, a plurality of pans, means for discharging a weighed parcel from said weighing machine into an empty pan, a first conveyor mechanism for moving said pans in a closed path to convey the resulting filled pan from a first position in said path where it receives a parcel and to convey a further empty pan into such first position, a plurality of buckets, a second conveyor mechanism for moving said buckets in succession and at regular intervals into a second position, means channeling parcels of material discharged from a filled pan at any of a plurality of positions in said closed path into a bucket at said second position, and detecting means operable in timed relation with said second conveyor mechanism for detecting the leading filled pan at any of said plurality of positions in the said closed path, and causing such pan to discharge its contents through said channeling means into that bucket which is located at said second position.

2. Apparatus as claimed in claim 1 wherein said detecting means comprises an electric circuit including, in series, a first switch which is closed by displacement of a filled pan under the weight of the parcel contained therein, and a second switch which is closed in response to said second conveyor mechanism upon location of a bucket at said second position.

3. Apparatus as claimed in claim 1 wherein each of said pans is supported for tilting movement to a contents discharging position, latch means normally retaining said pans against tilting movement, said latch means being operable by said detecting means to release said latch means to effect discharge of the leading filled pan.

CYRIL BEST.

References Cited in the file of this patent

UNITED STATES PATENTS

| Number | Name | Date |
|---|---|---|
| 701,555 | Ewing | June 3, 1902 |
| 1,122,334 | Taylor | Dec. 29, 1914 |
| 1,815,321 | Martin | July 21, 1931 |
| 2,378,579 | Popov | June 19, 1945 |
| 2,482,916 | Kane | Sept. 27, 1949 |